July 9, 1963

M. L. MILES ET AL 3,096,801

SEED POTATO CUTTER

Filed July 11, 1961

Merthen L. Miles
Scott W. Brown
Owen K. Ward
INVENTORS.

BY Clarence A. O'Brien
and Harvey B. Jacobson
Attorneys

July 9, 1963

M. L. MILES ET AL 3,096,801

SEED POTATO CUTTER

Filed July 11, 1961

Merthen L. Miles
Scott W. Brown
Owen K. Ward
INVENTORS.

BY Clarence A. O'Brien
and Harvey B. Jacobson
Attorneys

Merthen L. Miles
Scott W. Brown
Owen K. Ward
INVENTORS.

BY *Clarence A. O'Brien*
and *Harvey B. Jacobson*
Attorneys

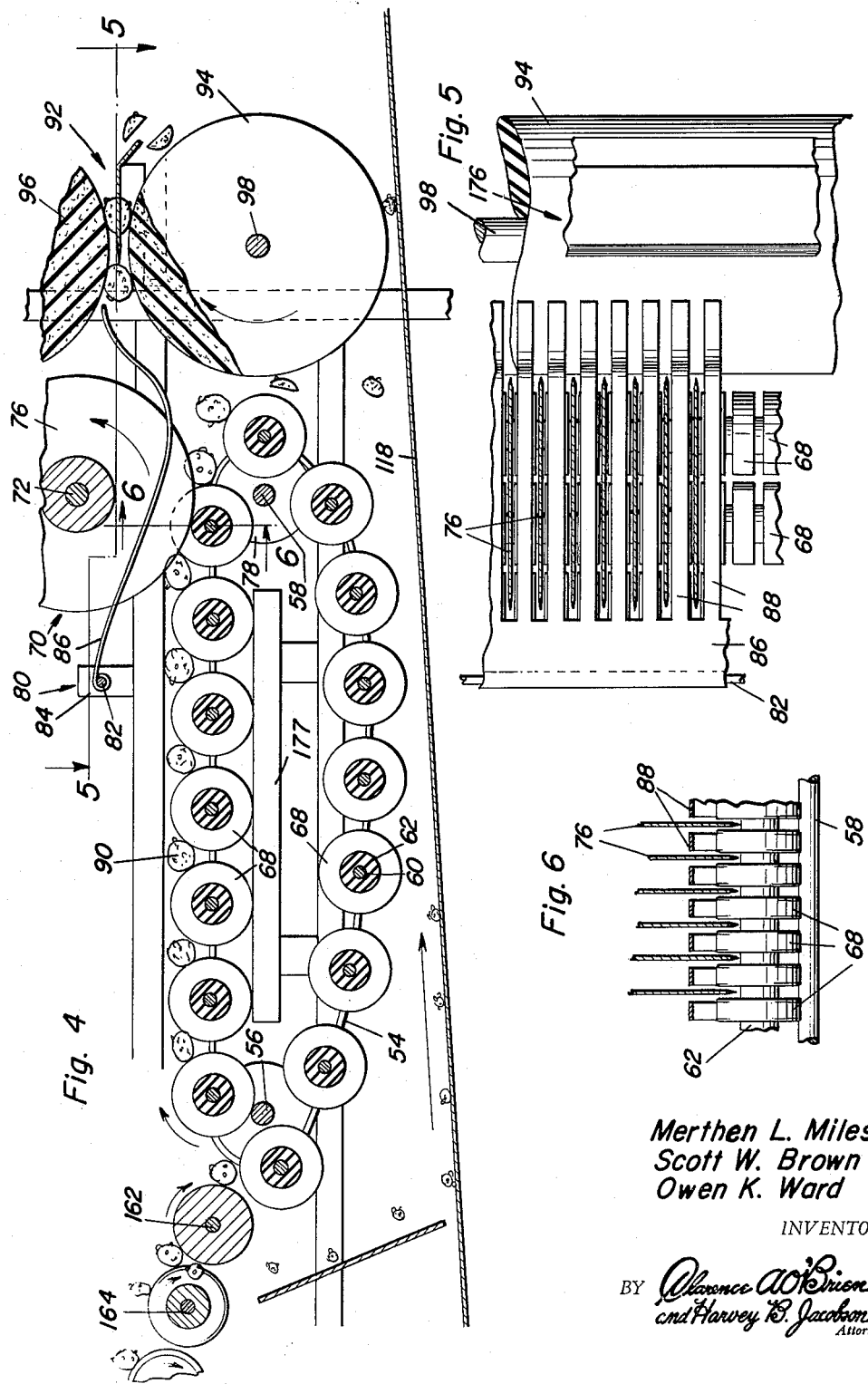

United States Patent Office 3,096,801
Patented July 9, 1963

3,096,801
SEED POTATO CUTTER
Merthen L. Miles, Rte. 1, Box 60, Scott W. Brown, Rte. 2, Box 107, and Owen K. Ward, Rte. 2, Box 309, all of Pocatello, Idaho
Filed July 11, 1961, Ser. No. 123,301
2 Claims. (Cl. 146—78)

This invention relates to a novel and useful seed potato cutter and more specifically to a cutting machine designed for cutting field run and unsorted seed potatoes of all sizes into proper size cut portions for planting.

In the past most seed potatoes have been hand cut into small segments with each segment containing an "eye" which is essentially the seed bud of new potato growth. While seed potato cutting machines have previously been devised, these machines have been relatively slow in operation, unable to accurately sort the potatoes which are being cut, ineffective in determining which seed potatoes must be cut and which potatoes are small enough so as not to require that they be cut and unable to sort out the clips (small ends) which either don't contain eyes or are too small for use in planting operations. The seed potato cutter of the instant invention has been specifically designed to be capable of high volume while at the same time being able to accurately cut those potatoes which require cutting into cut portions of the correct size.

It is of course very important that the cut portions of seed potatoes utilized for planting purposes be of substantially uniform size and that each cut portion include at least one "eye". Accordingly, it is the main object of this invention to provide a seed potato cutter which will be capable of handling field run and unsorted seed potatoes of all sizes and sorting the potatoes in a manner so as to convey smaller potatoes which do not need to be cut directly to a discharge point and route larger potatoes which require cutting to a double or two successive cutting stations.

A further object of this invention, in accordance with the immediately preceding object, is to provide the first cutting station with means for effectively ejecting the smaller cut portions of potatoes formed by the first cutting station and for conveying the larger cut portions of potatoes through a second cutting station for further cutting thereby.

Still another object of this invention, in accordance with the immediately preceding object, is to provide a seed potato cutter which will be capable of sorting all of the cut portions of seed potatoes and the whole smaller potatoes in a manner to reject the extremely small whole potatoes and the smaller clips or small ends which are too small for use in planting.

Still another object of this invention is to provide a seed potato cutter which will perform all of the preceding objects and still handle the potatoes being cut in a manner whereby bruising of the seed potatoes being handled is substantially eliminated.

A final object to be specifically enumerated herein is to provide a seed potato cutter which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 4 is an enlarged fragmentary longitudinal vertical sectional view taken substantially upon a plane passing through the longitudinal centerline of the seed potato cutter;

FIGURE 5 is a fragmentary horizontal sectional view taken substantially upon the plane indicated by the section line 5—5 of FIGURE 4; and FIGURE 6 is a fragmentary vertical transverse sectional view taken substantially upon the plane indicated by the section line 6—6 of FIGURE 4.

Figure 1:
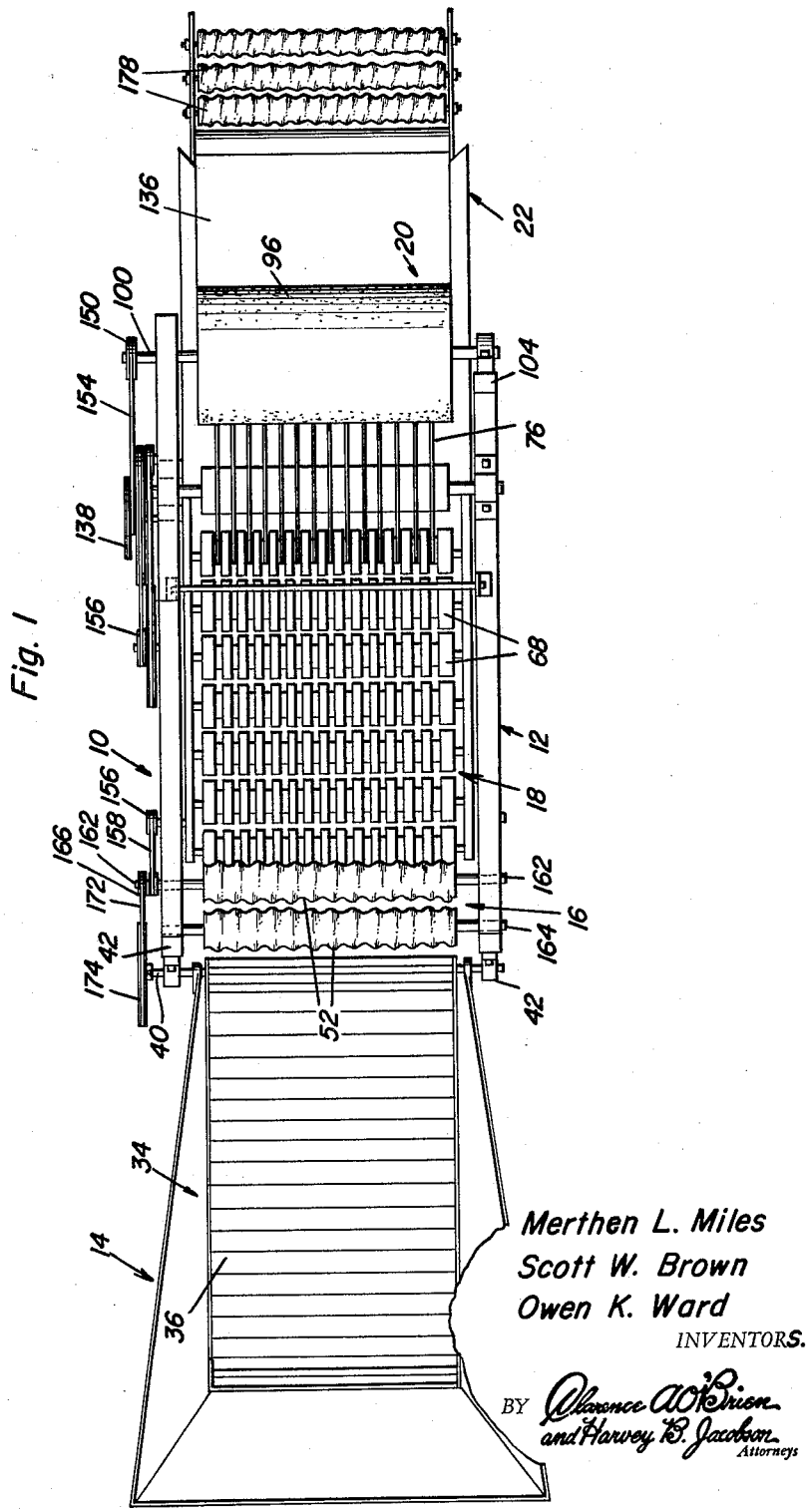
FIGURE 1 is a top plan view of the seed potato cutter.
Figure 2:
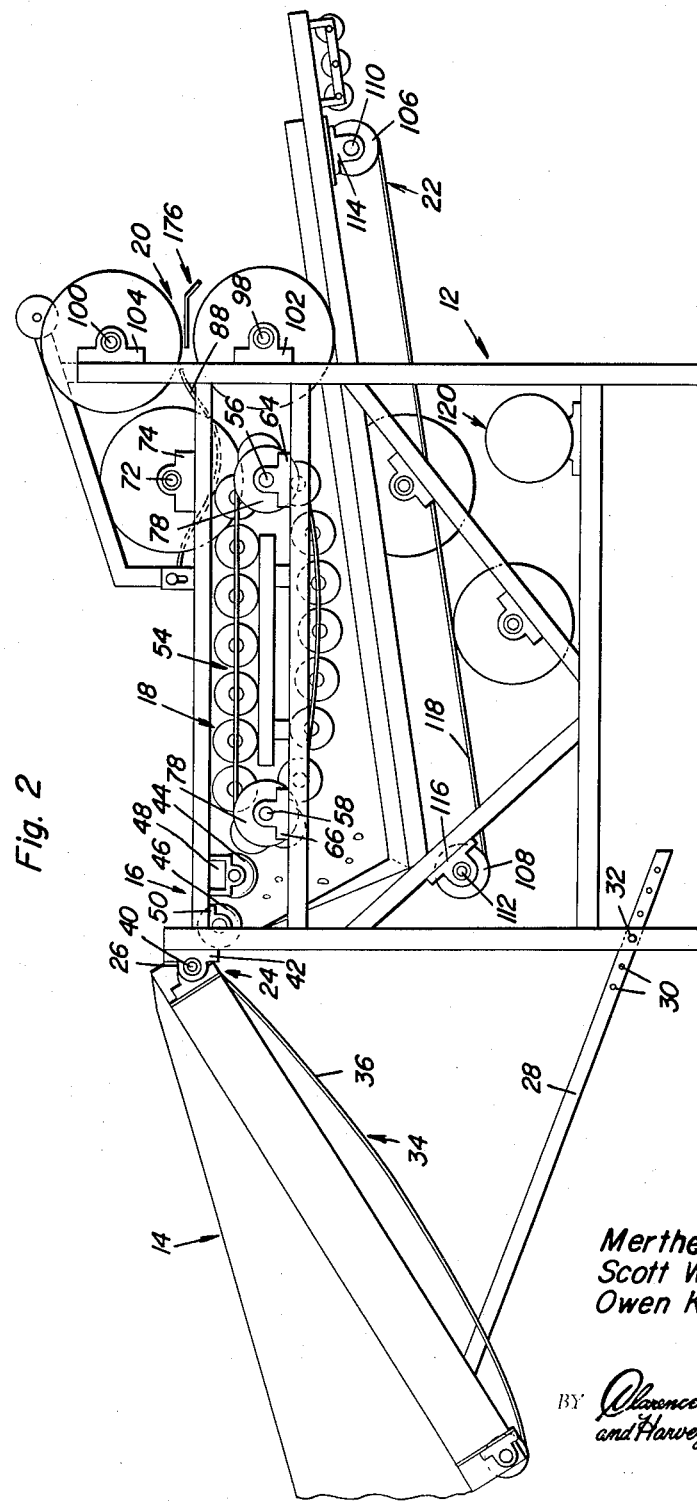
FIGURE 2 is a side elevational view of the seed potato cutter.

Referring now more specifically to the drawings the numeral 10 generally designates the seed potato cutter of the instant invention.

With attention now directed to FIGURES 1 through 4 of the drawings it will be seen that the seed potato cutter 10 includes a support frame 12. The seed potato cutter 10 is provided with a loading conveyor assembly generally referred to by the reference numeral 14 and a first conveyor assembly generally referred to by the reference numeral 16 which has its inlet registered with the outlet of the load conveyor 14. The outlet of the first conveyor 16 is registered with the inlet end of the second conveyor generally referred to by the reference numeral 18 and the second conveyor has an outlet registered with the inlet of a third conveyor generally referred to by the reference numeral 20. A fourth conveyor generally referred to by the reference numeral 22 extends longitudinally of the frame 12 and beneath the first, second and third conveyors 16, 18 and 20.

The load conveyor 14 includes a mounting frame generally referred to by the reference numeral 24 which is pivotally secured to the frame 12 as at 26 in any convenient manner. The end of the mounting frame 24 remote from its pivotal connection 26 with the frame 12 is provided with an adjustable brace member 28 by which the inclination of the mounting frame 24 may be adjusted. The brace member 28 includes a plurality of apertures 30 and is secured to the frame 12 by means of a fastener 32 secured through the frame 12 and a selected one of the apertures 30. The end of the brace member 28 remote from the apertures 30 is pivotally secured to the mounting frame 24 in any convenient manner. The mounting frame 24 includes an endless conveyor generally referred to by the reference numeral 34 which includes an endless flexible belt 36 entrained over a roller 38 at the free end of the mounting frame 24 and a similar roller (not shown) mounted on the shaft 40 which is rotatably journalled on one end of the frame 12 by means of bearing blocks 42. The shaft 40 may be utilized as the means for pivotally securing the mounting frame 24 to the frame 12.

The first conveyor 16 includes a pair of sorting rollers 44 and 46 which are journalled for rotation on the frame 12 by means of suitable bearing blocks 48 and 50 respectively. It is to be understood that the bearing blocks 48 and 50 may be secured to the frame 12 in any convenient manner in order that the bearing blocks 48 and 50 may be adjustably positioned longitudinally of the frame 12. Each of the rollers 44 and 46 includes a plurality of longitudinally spaced and circumferentially extending grooves 52. The second conveyor 18 is disposed immediately adjacent the side of the roller 44 remote from the roller 46 and the conveyor 18 includes an endless flexible member generally referred to by the reference numeral 54 which is entrained about a pair of generally horizontally aligned shafts 56 and 58. The endless flexible member 54 includes a plurality of longitudinally spaced and transversely extending support shafts 60 and each of the support shafts 60 has mounted thereon a resilient roller 62.

It will be noted that the shafts 56 and 58 are mounted upon the frame 12 by means of bearing blocks 64 and 66 respectively and also that each of the rollers 62 is provided with a plurality of longitudinally spaced positioning discs 68.

First cutting means generally referred to by the reference numeral 70 is provided and is operatively associated with the second conveyor 18. The first cutter means 70 includes a cutter shaft 72 journalled for rotation by means of bearing blocks 74 which are secured to the frame 12 in any convenient manner and the shaft 72 has a plurality of longitudinally spaced cutter discs 76 mounted thereon and in alignment with the spacing between the positioning discs 68 carried by the rollers 62.

From FIGURE 4 of the drawings it will be noted that the endless flexible member 54 actually includes a pair of laterally spaced endless flexible members interconnected by means of the shafts 60. The laterally spaced pair of endless flexible members are entrained about the supporting discs 78 which are secured to the shafts 56 and 58 in any convenient manner for rotation therewith.

From FIGURE 4 of the drawings it will be also noted that the outer circumferential portions of the cutter discs 76 extend to a point immediately adjacent the resilient rollers 62 as the latter pass beneath the shaft 72. In this manner, the cutter discs 76 pass between the positioning discs 68 carried by the rollers 62 and will sever the potatoes positioned between the adjacent sets of positioning discs 68 carried by adjacent rollers 62.

The first cutter means 70 includes ejection means generally referred to by the reference numeral 80 and the ejection means 80 comprises a support shaft 82 secured between opposite sides of the frame 12 by means of mounting flanges 84 and an ejection plate 86 is mounted on the shaft 82 and includes a plurality of cam arms or straps 88 which extend between adjacent cutter discs 76. From FIGURE 4 of the drawings it will be noted that the cam straps 88 extend substantially along chords of the cutting discs 76. It is to be understood that the potatoes 90 being cut by the cutting discs 76 will have portions thereof wedged between adjacent cutting discs 76. Then, upon further rotation of the cutting discs 76, the cut portions of the potatoes 90 wedged between the cutting discs 76 will be urged outwardly from between the cutting discs 76 by means of the cam straps 88. It is to be observed that the cam straps 88 are flexible and resilient and that upon a wedged portion of potato engaging one of the cam straps 88 the latter will bend upwardly at its free end and so as to discharge the cut portions of potatoes disposed between the discs 76 in a direction aligned with the inlet of the third conveyor means generally referred to by the reference numeral 92. The third conveyor means 92 comprises a pair of large diameter resilient rollers 94 and 96 which are mounted on shafts 98 and 100 respectively and inasmuch as the discs 78 are rotating at high speed, the inertia of the cut portions of potatoes ejected by means of the cam straps will be sufficient to carry the cut portions of potatoes to the space between the rollers 94 and 96 defining the inlet of the third conveyor means 92. The shafts 98 and 100 are mounted on the frame 12 by means of bearing blocks 102 and 104 respectively and these bearing blocks 102 and 104 may also be adjustably positioned on the frame 12 as may the bearing blocks 74 and the bearing blocks 64 and 66.

The fourth conveyor 22 includes a pair of rollers 106 and 108 which are rotatably mounted on the frame 12 by means of shafts 110 and 112. The shafts 110 and 112 are rotatably supported by means of bearing blocks 114 and 116 respectively and an enless flexible member 118 is entrained about the rollers 106 and 108.

Figure 3:
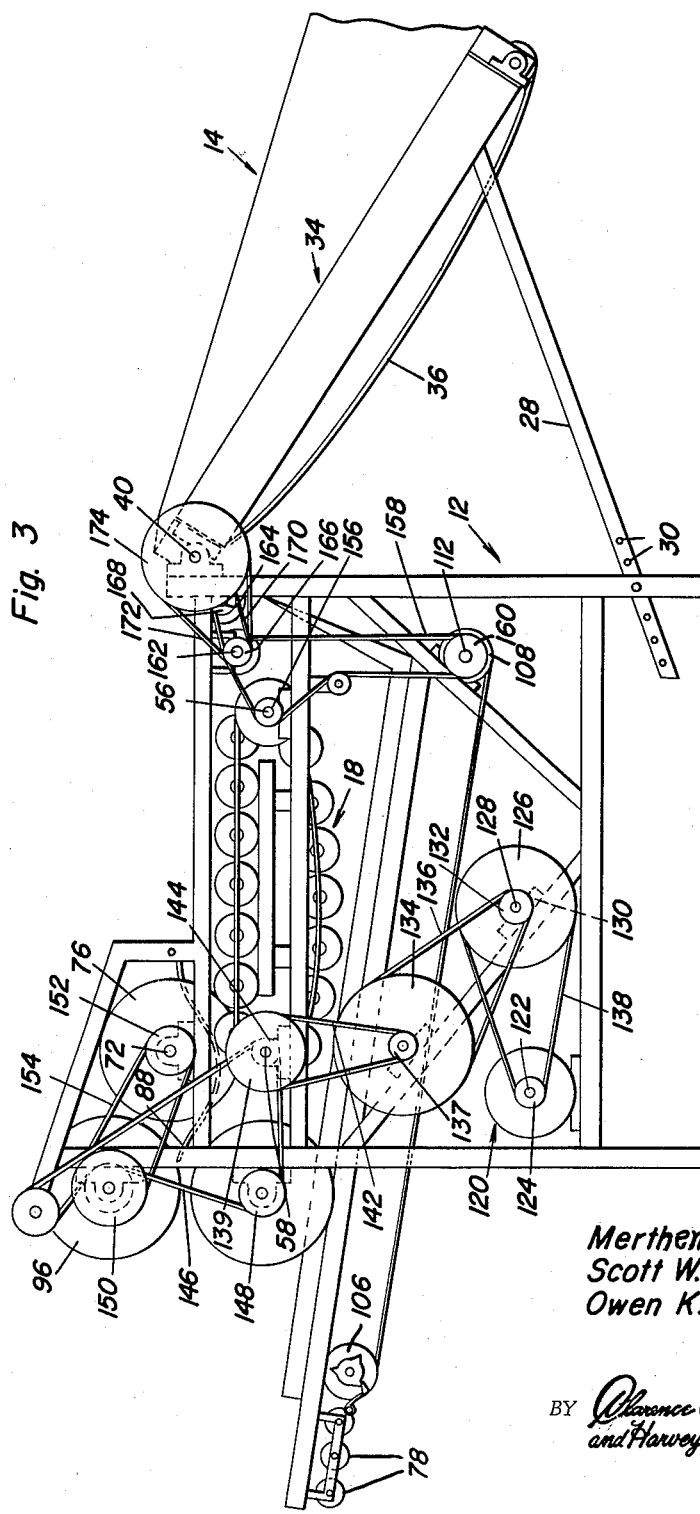
FIGURE 3 is a side elevational view of the seed potato cutter similar to that shown in FIGURE 2 but from the opposite side of the potato cutter.

It will be noted from FIGURE 3 of the drawings that the frame 12 includes an electric motor generally referred to by the reference numeral 120. The electric motor 120 includes an output shaft 122 to which there is secured a pulley 124 which is drivingly connected to an idler pulley 126 rotatably journalled on the frame 12 by means of shaft 128 and bearing blocks 130. The idler pulley 126 includes a small diameter pulley 132 which is drivingly connected to an idler pulley 134 by means of an endless flexible belt 136. It will be noted that an endless flexible belt 138 extends between the pulleys 124 and 126. The idler pulley 134 also includes a small diameter pulley which is referred to by the reference numeral 137 and this pulley is drivingly connected to a pulley 139 journalled on the main frame 12 by means of the shaft 58. An endless flexible belt 142 drivingly connects the pulleys 137 and 139 and the shaft 58 also has a pulley 144 mounted thereon which is drivingly connected to the rollers 94 and 96 by means of an endless flexible belt 146 which is entrained over the pulley 144 and the pulleys 148 and 150 carried by the rollers 94 and 96 respectively.

The roller 96 is drivingly connected to a pulley 152 carried by shaft 72 by means of an endless flexible member 154 and in this manner the motor 120 also drives the shaft 72 and the cutter discs 76 secured thereto.

In addition, it will be noted that the roller 78 is mounted on the shaft 58 and in this manner the motor 120 also drives the endless flexible member 154 comprising the second conveyor 18.

The shaft 56 has a pulley 156 connected thereto and in this manner the roller 108 of the fourth conveyor 22 is drivingly connected to the motor 120 by means of an endless flexible belt 158 which is entrained about the pulley 156 and the pulley 160 secured to the shaft 112.

It will be noted that the rollers 44 and 46 are mounted on shafts 162 and 164 and that these shafts include pulleys 166 and 168. The endless flexible belt 158 is entrained about the pulley 166 and an endless flexible belt 170 drivingly connects the pulley 168 to the pulley 166 whereby each of the rollers 44 and 46 are also drivingly connected to the motor 120. In addition, an endle ssflexible belt 172 is entrained about the pulley 166 and the pulley 174 which is secured to the shaft 40. Accordingly, the loading conveyor 14 is also drivingly connected to the motor 120.

In operation, the seed potatoes to be cut are loaded on the inlet end of the load conveyor 14 which will then convey the seed potatoes up to the first conveyor 16 comprised of the rollers 44 and 46. The extremely small potatoes not requiring cutting will then drop between the rollers 44 and 46 and onto the endless flexible member 118 of the fourth conveyor 22.

The larger potatoes handled by the first conveyor 16 will then be discharged onto the inlet end of the second conveyor 18 whereby the potatoes will be positioned and cradled between the positioning or cradling discs 68. Then, as the conveyor 18 moves the potatoes 90 past the cutter discs 76, the discs will cut the seed potatoes 90. Larger portions of the seed potatoes wedged between the cutter discs 76 will then be discharged or ejected by means of the cam straps 88 into the inlet for the third conveyor means 92 defined by the space between the rollers 94 and 96. However, the smaller portions of the potatoes 90 which are not wedged between the cutting discs 76 will fall between the discharge end of the second conveyor 18 and the roller 94 onto the endless flexible member 118. As the larger cut portions of the potatoes 90 which were wedged between the cutting discs 76 are received between the resilient rollers 94 and 96, they are fed past the stationary knife generally referred to by the reference numeral 176. This stationary knife will further cut each of the larger cut portions of the potatoes 90 and the resulting two cut portions will then fall downwardly onto the endless flexible member 18.

With attention now directed more specifically to FIGURE 1 of the drawings all of the smaller potatoes which have fallen between the rollers 44 and 46, the smaller cut portions of the potatoes which have fallen from the discharge end of the second conveyor 18 and the twice cut portions of potatoes passing between the rollers 94 and 96 handled by the endless flexible member 118 are fed onto the plurality of longitudinally spaced rollers 178 which are each journalled for rotation in the main frame 12 for rotation about axes spaced longitudinally of the main frame 12 and extending transversely of the path of movement of the potatoes. The extremely small potatoes which have dropped between the rollers 44 and 46, the small clips which don't contain eyes or are too small for planting use and the smaller portions of potatoes which may have been cut by the stationary knife 176 fall between the rollers 178. The rest of the larger small potatoes and large cut portions of potatoes then continue past the roller 178 remote from the loading conveyor 14 and into a suitable receptacle prior to planting. In this manner, substantially all of the objectionable smaller potatoes and smaller cut portions of potatoes will be eliminated from those small potatoes and cut portions of potatoes suitable for planting purposes.

With attention again directed to FIGURE 4 of the drawings it will be noted that the second conveyor 18 includes a support platform 177 which underlies the upper reach of the endless flexible member. As the positioning discs 68 pass over the platform 177 they are disposed in rolling contacting relation with the latter and this rotating motion of the discs 68 insures that the potatoes 90 cradled between adjacent rows of axially aligned discs will be spread apart the full width of the second conveyor 18.

It may be readily observed that the seed potato cutter herein described is capable of handling a large number of potatoes and with extreme accuracy whereby the maximum number of suitable cut portions of seed potatoes are provided for planting purposes.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A conveyor for conveying and cutting seed potatoes, said conveyor comprising support means and an endless conveyor guided for movement through a closed path by said support means and including an upper reach having an inlet end and an outlet end, said endless conveyor including a plurality of sets of transversely aligned and spaced discs, spaced longitudinally of said closed path and adapted to support and cradle potatoes between adjacent sets of discs, knife means comprising disc knives rotatably mounted on said support means above the discharge end portion of said upper reach and spaced longitudinally along the axis of rotation of said knives which extends transversely of the path of movement of said upper reach, the lower extremities of said disc knives projecting downwardly and received between adjacent cradling discs of the sets of discs of said conveyor whereby potatoes carried by said conveyor will be cut and have the larger cut portions thereof wedged between adjacent ones of said disc knives, motor means drivingly connected to said disc knives for effecting rotation of said disc knives in a direction with their lower marginal portions moving in the direction of movement of said upper reach, extracting means carried by said support means comprising a plurality of elongated cam straps each secured at one end to said support means with the free end portion thereof extending generally along chords of and between adjacent disc knives above and below said upper reach and said axis respectively and generally in the direction of movement of said upper reach completely across said adjacent disc knives, whereby as said disc knives rotate with said cut portions of potatoes wedged therebetween, said cut portions will engage said cam straps to be cammed generally radially outwardly from between adjaecnt ones of said disc knives along paths defining a generally horizontally disposed plane of discharge of said cut portions, a pair of opposing soft and resilient and driven rollers spaced slightly apart and supported from said support means for rotation about horizontally disposed axes extending transversely of the direction of movement of said upper reach and positioned with respect to each other and the support means in order to generally horizontally align the space defined between said rollers with the plane of discharge of said cut portions from between said disc knives 9, an elongated knife blade mounted on said support means adjacent said rollers and including a cutting edge disposed in said space and extending longitudinally of said rollers for again cutting the cut portions of the potatoes after they are discharged from between said disc knives.

2. The combination of claim 1 wherein said elongated cam straps are somewhat resilient.

References Cited in the file of this patent
UNITED STATES PATENTS

| | | |
|---|---|---|
| 1,710,421 | Jorgenson | Apr. 23, 1929 |
| 2,503,069 | Reichart | Apr. 4, 1950 |
| 2,510,291 | McLauchlan | June 6, 1950 |
| 2,577,086 | Magnuson | Dec. 4, 1951 |
| 2,752,967 | Sylvain | July 3, 1956 |